Patented Apr. 4, 1950

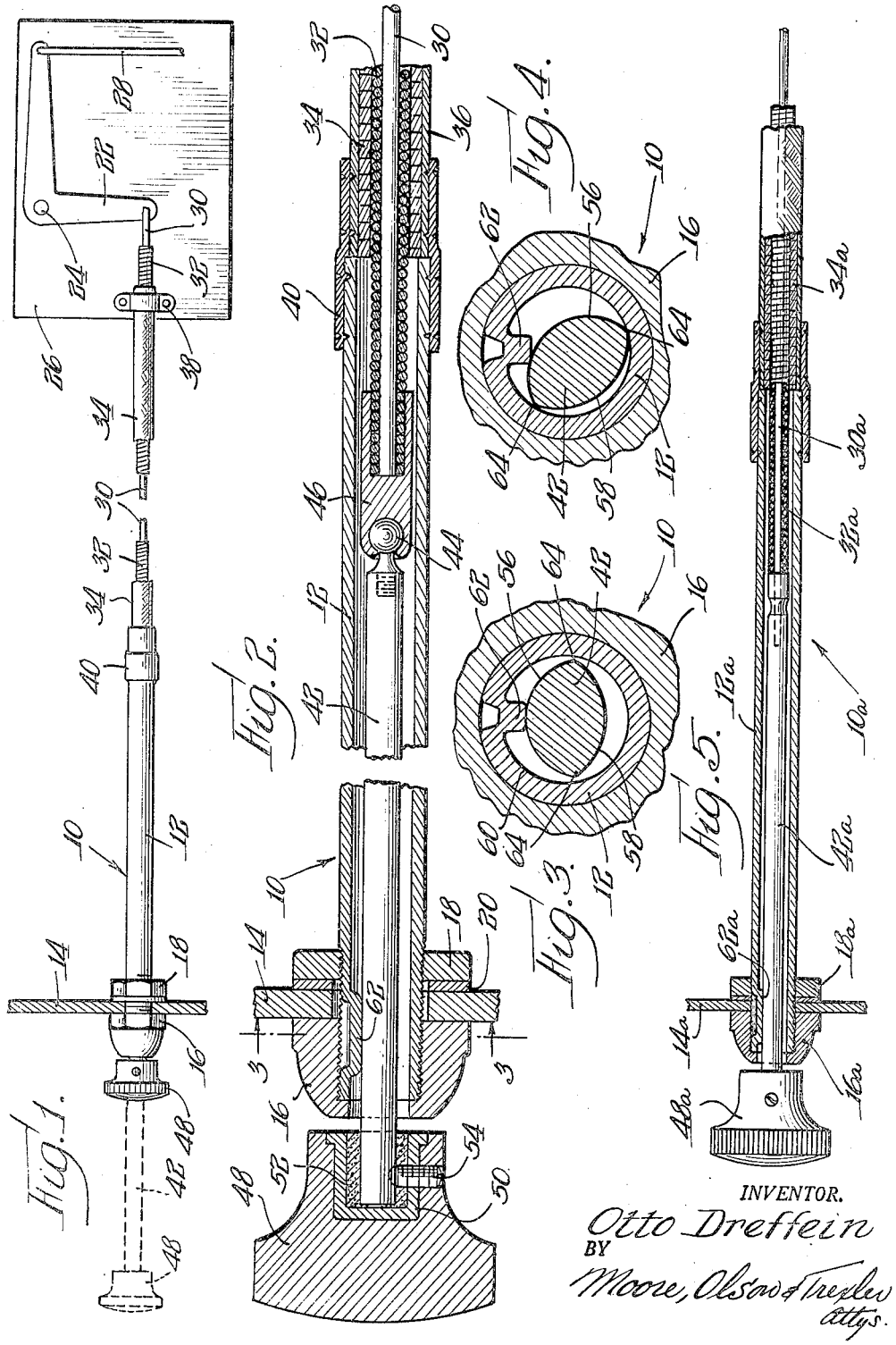

2,502,780

UNITED STATES PATENT OFFICE 2,502,780

CONTROL MECHANISM

Otto F. Dreffein, Chicago, Ill., assignor to Arens Controls, Inc., Chicago, Ill., a corporation of Illinois Application January 2, 1947, Serial No. 719,759

12 Claims. (Cl. 74—502)

1

This invention relates to control mechanisms, and more particularly to that type of control mechanism adapted for reciprocatory manual actuation and wherein the mechanism and the device controlled thereby is adapted to be releasably locked in various adjusted positions by a predetermined rotary movement of the manually controlled handle.

It is an object of the invention to provide a control mechanism of the foregoing type, of improved construction and operating characteristics.

More specifically stated, it is an object of the invention to provide an improved control mechanism of the foregoing type, which can be more economically fabricated and assembled, while at the same time providing a smooth movement when in released position and a smooth actuation into locking position, and which when in locked position provides, if desired, a strong locking action which is self-holding and resistant to vibration.

A further object of the invention is to provide a more simplified and improved control mechanism of the foregoing type, which is rugged in use, and wherein the locking effectiveness and smoothness of operation of the structure are not impaired by use.

A still further object of the invention is to provide an improved and simplified control mechanism of the type defined wherein the type and degree of locking action may be readily varied and controlled, wherein the locking operation is secured in a positive and predictable manner, and wherein the locking effectiveness of the unit is not impaired by dirt, moisture, or normal manufacturing tolerances.

Various other objects, advantages and features of the invention will be apparent from the following specification, when taken in connection with the accompanying drawings, wherein certain preferred structural embodiments are set forth for purposes of illustration.

In the drawings, wherein like reference numerals refer to like parts throughout:

Fig. 1 is a general assembly view of a control mechanism or structure constructed in accordance with and embodying the principles of the present invention;

Fig. 2 is a longitudinal sectional view of the structure of Fig. 1, illustrated upon an enlarged scale;

Fig. 3 is a transverse sectional view, on a further enlarged scale, taken as indicated by the line 3—3 of Fig. 2;

2

Fig. 4 is a view similar to Fig. 3, but illustrating the parts in locked position; and Fig. 5 is a view similar to Fig. 2, but illustrating a modified form of structure.

Referring more specifically to the drawings, and first to the structural embodiment illustrated in Figs. 1-4, the control mechanism shown, generally indicated by the reference numeral 10, comprises a frame sleeve 12, of elongated tubular construction, fixed at one end to a support panel 14, by means of suitable lock nuts as indicated at 16 and 18. The nuts 16 and 18 are threaded onto the end of the sleeve, as shown, there preferably being a lock washer or the like, as indicated at 20, interposed between the nut 18 and the support panel, so as to provide a vibration resistant rigid support mounting for the frame sleeve 12. The panel 14 may, for example, be the dash board or control panel of a vehicle or the like, or other suitable support structure with which the device is to be used.

In the particular illustrative embodiment of Fig. 1, the control mechanism of the invention is shown applied to the actuation and control of an operated member 22 in the form of a bell crank, and pivotally mounted as indicated at 24, upon the frame structure 26 of the device to be actuated. One end of the bell crank has connection with a link or other operated member, as indicated at 28, the opposite end of the bell crank being pivotally connected to a control wire 30, by means of which the parts are adapted for actuation.

The control wire 30, in the particular embodiment illustrated, is integrally associated with an embracing wire coil 32, the core wire 30 and the embracing coil wire 32 being shiftable as a unit within a stationary sheath structure which in the embodiment shown preferably comprises a wire coil 34, Fig. 2, and suitable fabric or protective coating 36.

It will be seen that the flexible sheath structure 34—36 comprises a flexible interconnection between the control mechanism 10 and the operated device 26, the composite operating cable structure 30—32 being longitudinally reciprocable therethrough to effect the actuation of the operated bell crank. The sheath structure 34—36 may be secured to the operated device by means of a securing bracket, as indicated at 38, Fig. 1, and to the end of the control mechanism sleeve 12 by means of a cylindrical bracket clip 40. As will be understood, the particular form of operated device constitutes no part of the present invention, the control mechanism thereof, and its associated transmission structures, being adapted for the actuation and control of various types of operated devices which are adapted for adjustable positioning, and selective locking or holding in various positions within the range of operated movement.

A combined operating and control member 42 is mounted within the frame sleeve 12 for longitudinal sliding movement therein. The member 42 is provided at one end with a ball bracket 44 associated with a socket bracket 46, the parts 44—46 thus forming a ball and socket connection adapted for universal movement. The ball member 44 may be conveniently threaded into the end of the bar 42, whereas the bracket 46 is preferably swedged onto the end of the shiftable transmission cable 30—32. It will be seen that by reason of the construction thus provided, longitudinal movements imparted to the operating member or bar 42 will be correspondingly transmitted into the shiftable cable, the member 42, however, being independently rotatable, as may be required.

The opposite end of the combined operating and control member 42 is provided with a handle 48 adapted for manual actuation, the handle being rigidly fixed onto the end of the operating bar. More particularly, and as best shown in Fig. 2, the handle may have pressed therein a metal bushing 50 into which is deposited a mass of solder or other securing material 52, the solder conforming to the irregularities in contour of the bar 42, presently to be described, and filling the space between the bar and the bushing. The solder may be melted and then solidified, in the usual manner, thus providing a firm interconnection between the handle bushing and the bar end. To further reinforce the connection, and increase the strength thereof, the parts may be drilled and tapped, and a set screw 54 inserted therein, as shown.

The bar 42 has a cross-sectional contour, as best indicated in Figs. 3 and 4. More particularly, the bar is formed with two arcuate surfaces as indicated at 56 and 58, the radius of curvature of the surface 58 being greater than that of the surface 56, and the radius of curvature of the surface 56 preferably being substantially the same as the radius of curvature of the inner surface 60 of the frame sleeve 12.

The bar 42 may be of uniform cross-sectional contour along its entire length, as shown, and thus may be economically fabricated in long lengths either by extrusion, rolling, or longitudinal machining by means of a milling cutter, and then cut into shorter lengths in accordance with the requirements of each particular installation. If extruded, the bar may be ejected through a die opening of the desired contour. When formed by the use of a milling cutter, round bar stock having one desired curvature, for example the curvature 56, may be employed, and the bar subjected to the action of a suitably shaped milling cutter movable longitudinally thereof to provide the surface 58. When rolled, it is merely necessary to pass the bar between pairs of rollers of the desired shape in the usual manner. It will be noted that the means for connecting the ball 44 to one end of the bar, and the means for securing the handle 48 to the other bar end are both adapted for cooperation with the bar contour described so that uniform bar stock may be employed.

Similarly, the sleeve 12 may be fabricated by cutting and end threading suitable lengths of elongated tubing stock, thus providing an economical and readily fabricated structure.

Adjacent one end thereof the sleeve 12 is provided with an inwardly struck detent or locking lug 62. This lug may be conveniently formed by means of a stamping die or the like, the operation preferably being effected prior to the end threading of the sleeve 12, so that the threads will be properly formed for ready cooperation with the lock nuts 16 and 18 as previously described.

In the operation of the structure, the locking lug 62 cooperates with the bar 42 and the curved surfaces thereof, so that the bar may be locked in various positions of its longitudinal adjustment within the sleeve by the rotation of the bar through a predetermined angular distance, a distance of slightly more than 45° in the particular embodiment shown. More particularly, as the bar 42 is rotated from the position shown in Fig. 3 to that indicated in Fig. 4, the locking lug 62 is cammed against the arcuate surface 56 of the bar, causing the bar to become wedged against the internal surface of the sleeve at the points of juncture 64 defined by the meeting of the two arcuate surfaces.

It has been found that a construction formed as described exhibits a very smooth and positive locking action as the manual control is rotated to bring the parts into locking engagement. It has further been found that a very rugged construction is thereby provided which does not lose its smoothness of operation even when subjected to severe operating conditions over protracted periods of time. By properly proportioning the arcs of curvature upon the bar 42, a strong locking action can be secured, if desired, which is self-holding and resistant to vibration. By varying the curvature of the surfaces 56 and 58, and by varying the size of the bar 42 in respect to the internal bore of the sleeve 12, locking characteristics of different desired types and kinds can be obtained, more particularly in reference to the required angle of rotation of the manual control handle, and the locking effectiveness secured thereby; while at the same time the structure is not unduly sensitive to normal manufacturing tolerances, nor is it adversely affected by dirt, moisture, and foreign matter which may be encountered in normal use.

When in released position, as shown in Fig. 3, free and smooth longitudinal movement of the combined operating and control bar 42 within the sleeve is permitted, whereas by rotation of the bar into the locking position shown in Fig. 4, the bar becomes firmly locked against longitudinal movement within the sleeve, thus releasably holding the operated device in its adjusted position. Due to the invariable positioning of the locking lug 62, it is insured that a quick and invariable locking action will be secured whenever the control handle is moved to its locking position.

In the construction illustrated in Figs. 1–4, the ball and socket connection between the end of the bar 42 and the movable transmission cable permits the free rotation of the bar into desired locked or unlocked position. In certain instances, it may be desirable to employ the resiliency of the transmission cable, tending to urge the bar into locked or unlocked position, as may be desired. Such an arrangement is illustrated in Fig. 5. In Fig. 5 a construction essentially similar to that previously described is shown, except that in this instance the end of the operating and control bar or member 42a is swedged directly into the end of the core wire 30a forming a part of the shiftable cable. The core wire, being anchored at its opposite end against rotation by virtue of its connection with the operated device, thus resiliently urges the bar 42a into a predetermined rotatable position. This position may be either the locked position, or the unlocked position, in accordance with the characteristics desired in any installation. The resiliency of the core wire, and of the coil wire 32 integral therewith, permits the resilient rotation of the bar 42a through a sufficient angle of movement to effect its locking and unlocking function. Also, the resilient force of the transmission cable in a rotative direction is not sufficient to either lock or unlock the bar, but merely acts as a pre-positioning means.

It will thus be seen that in accordance with the present invention a control mechanism is provided which may be manually actuated in a push-pull manner to effect the desired adjustment of an operated device, and readily locked in any desired position within its range of movement by a predetermined manual rotation of the actuating control handle. The structure may be economically fabricated and assembled and is possessed of the operating characteristics heretofore specifically discussed.

It is obvious that various changes may be made in the specific embodiments set forth without departing from the spirit of the invention. The invention is accordingly not to be limited to the specific embodiments shown and described, but only as indicated in the following claims.

The invention is hereby claimed as follows:

1. A control mechanism comprising a frame member, an operating member longitudinally reciprocable with respect to the frame member and adapted to be connected to a device to be controlled, a control handle operatively connected to the operating member for effecting its actuation, and locking means controlled by a rotary movement of said control handle for releasably locking the operating member from movement with respect to the frame member, said locking means comprising an abutment anchored to one of said members, and an elongated cam surface of irregular cross sectional contour cooperable therewith and carried by the other of said members, said cam surface comprising a pair of relatively symmetrically disposed circular arcs of different radii.

2. A control mechanism comprising a frame member, an operating member longitudinally reciprocable with respect to the frame member and adapted to be connected to a device to be controlled, a control handle operatively connected to the operating member for effecting its actuation, and locking means controlled by a rotary movement of said control handle for releasably locking the operating member from movement with respect to the frame member, said locking means comprising an abutment anchored to the frame member, and an elongated cam surface cooperable therewith formed longitudinally of the operating member, said cam surface comprising a pair of dissimilar arcs forming a pair of relatively sharp edges at their points of juncture along substantially opposite sides of said operating member.

3. A control mechanism comprising a frame member, an operating member longitudinally reciprocable with respect to the frame member and adapted to be connected to a device to be controlled, a control handle operatively connected to the operating member for effecting its actuation, and locking means controlled by a rotary movement of said control handle for releasably locking the operating member from movement with respect to the frame member, said locking means comprising an abutment carried by the frame member, and an elongated cam surface of irregular cross-sectional contour formed longitudinally of the operating member cooperable with the abutment in all positions of the operating member to effect the locking thereof, said cam surface comprising a pair of dissimilar arcs forming a pair of relatively sharp edges at their points of juncture along substantially opposite sides of said operating member.

4. A control mechanism comprising a frame structure formed with an elongated sleeve portion, an operating structure comprising an elongated bar longitudinally reciprocable within the frame sleeve, said bar being adapted to be connected to a device to be controlled, a control handle connected to the operating bar at one end thereof for effecting its actuation and control, and locking means controlled by a rotary movement of the control handle for releasably locking the operating bar from movement with respect to the frame sleeve, said locking means comprising an abutment carried by one of said structures, and an elongated cam surface of irregular cross-sectional contour carried by the other of said structures and cooperable with said abutment to effect the locking action, said cam surface comprising a pair of relatively symmetrically disposed circular arcs of different radii.

5. A control mechanism comprising a frame structure formed with an elongated sleeve portion, an operating structure comprising an elongated bar longitudinally reciprocable within the frame sleeve, said bar being adapted to be connected to a device to be controlled, a control handle connected to the operating bar at one end thereof for effecting its actuation and control, and locking means controlled by a rotary movement of the control handle for releasably locking the operating bar from movement with respect to the frame sleeve, said locking means comprising an inwardly struck detent formed on the sleeve, and an elongated cam surface formed on the operating structure and cooperable with the detent for effecting the locking action, said cam surface comprising a pair of dissimilar juxtaposed arcuate surfaces.

6. A control mechanism comprising a frame member, an operating member longitudinally reciprocable with respect to the frame member and adapted to be connected to a device to be controlled, a control handle operatively connected to the operating member for effecting its actuation, and locking means controlled by a rotary movement of said control handle for releasably locking the operating member from movement with respect to the frame member, said locking means comprising an abutment anchored to one of said members, and an elongated cam carried by the other of said members cooperable with said abutment, said cam comprising a pair of arcuate portions of different radii defining an elongated cam of uniform cross-sectional contour having a pair of relatively sharp oppositely disposed biting edges at the lines of juncture of said arcuate portions.

7. A control mechanism comprising a frame structure having an elongated frame sleeve, an operating member comprising an elongated bar longitudinally reciprocable within the frame sleeve, connecting means at one end of the bar adapted for connection with a device to be controlled, a control handle connected to the other end of the operating bar for effecting its actuation and control, and locking means controlled by a rotary movement of said control handle for releasably locking the operating bar from movement in respect to the frame sleeve, said locking means comprising an abutment carried by the frame, and an elongated cam formed on the operating bar, said cam comprising a pair of arcuate surfaces of different radii defining a longitudinally extending cam section of uniform cross-sectional contour having a pair of relatively sharp oppositely disposed biting edges at the lines of juncture of said arcuate surfaces.

8. A control mechanism comprising a frame structure having an elongated frame sleeve, an operating member comprising an elongated bar longitudinally reciprocable within the frame sleeve, a flexible transmission cable connected to one end of the bar, said transmission cable being adapted for connection with a device to be controlled, a control handle connected to the other end of the operating bar for effecting its actuation and control, and locking means controlled by a rotary movement of said control handle for releasably locking the operating bar from movement in respect to the frame sleeve, said locking means comprising an abutment carried by the frame, and an elongated cam formed on the operating bar, said cam comprising a pair of arcuate surfaces of different radii defining a longitudinally extending cam section of uniform cross-sectional contour having a pair of relatively sharp oppositely disposed biting edges at the lines of juncture of said arcuate surfaces.

9. A control mechanism as defined in claim 8 wherein the transmission cable is swivelly connected to the operating bar.

10. A control mechanism as defined in claim 8 wherein the transmission cable is rigidly connected to the end of the operating bar.

11. A control mechanism comprising a frame structure having an elongated circular frame sleeve, an elongated operating bar longitudinally reciprocable within the frame sleeve, said bar being adapted for connection at one end to a device to be controlled, a control handle carried by the other end of the bar for effecting its actuation and control, and locking means controlled by a rotary movement of the control handle for releasably locking the bar from movement in respect to the frame sleeve, said locking means comprising an abutment carried by the frame, and an elongated cam formed on the operating bar, said cam comprising a pair of circular arcuate surfaces of different radii defining a longitudinally extending cam section of uniform cross-sectional contour upon the operating bar, the radius of the arcuate surface of lesser radius being substantially equal to the radius of curvature of the internal bore of the circular frame sleeve.

12. A control mechanism comprising a frame member, an operating member longitudinally reciprocable with respect to the frame member and adapted to be connected to a device to be controlled, locking means controlled by rotary movement of the operating member for releasably locking the operating member from movement in respect to the frame member, said locking means comprising an abutment anchored to the frame member, and an elongated cam surface of irregular cross sectional contour cooperable therewith and extending throughout the length of the operating member, a control handle having a substantially annular recess within which one end of the operating member is disposed, and a body of moldable material disposed within the control handle recess and securing said operating member end therein.

OTTO F. DREFFEIN.

REFERENCES CITED

The following references are of record in the file of this patent:

UNITED STATES PATENTS

| Number | Name | Date |
|---|---|---|
| 1,630,213 | Petry | May 24, 1927 |
| 1,652,794 | Piel, Jr. | Dec. 13, 1927 |

FOREIGN PATENTS

| Number | Country | Date |
|---|---|---|
| 409,153 | Germany | Feb. 3, 1925 |